United States Patent
Ikeda et al.

(10) Patent No.: US 7,650,014 B2
(45) Date of Patent: Jan. 19, 2010

(54) IMAGE ANALYSIS APPARATUS

(75) Inventors: Hitoshi Ikeda, Kanagawa (JP);
Motofumi Fukui, Kanagawa (JP);
Takahiko Kuwabara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 636 days.

(21) Appl. No.: 11/330,151

(22) Filed: Jan. 12, 2006

(65) Prior Publication Data
US 2006/0280333 A1    Dec. 14, 2006

(30) Foreign Application Priority Data
Jun. 14, 2005   (JP) ............................. 2005-174412

(51) Int. Cl.
*G06K 9/00*   (2006.01)
*H04N 5/225*   (2006.01)
(52) U.S. Cl. .................. 382/103; 382/219; 348/218.1
(58) Field of Classification Search .............. 382/103, 382/106, 107, 108, 154, 162, 167, 168, 181, 382/194, 201, 209, 219, 232, 274, 276, 291, 382/305, 312; 348/96, 362, 254, 246, 218.1
See application file for complete search history.

(56) References Cited

U.S. PATENT DOCUMENTS

| | | | | |
|---|---|---|---|---|
| 6,204,881 B1 * | 3/2001 | Ikeda et al. | ................. | 348/362 |
| 6,246,779 B1 * | 6/2001 | Fukui et al. | ................. | 382/103 |
| 6,995,790 B2 * | 2/2006 | Higurashi et al. | ........ | 348/218.1 |
| 7,092,005 B2 * | 8/2006 | Takanashi | .................... | 348/96 |
| 7,301,571 B2 * | 11/2007 | Kobayashi et al. | .......... | 348/246 |
| 7,372,487 B2 * | 5/2008 | Horiuchi | .................... | 348/254 |

FOREIGN PATENT DOCUMENTS

JP      A 08-320920      12/1996

* cited by examiner

*Primary Examiner*—Seyed Azarian
(74) *Attorney, Agent, or Firm*—Oliff & Berridge PLC

(57) ABSTRACT

An image analysis apparatus includes a unit that accepts plural dynamic image data obtained by imaging a subject to be recognized from positions different from each other, a unit that detects a part to be detected of the subject to be recognized from series of frame image data respectively included in the plural dynamic image data, and a correction unit that compares information of a detection position of the part to be detected from the respective dynamic image data and corrects at least a part of the information of the detection position of the part to be detected from the respective dynamic image data on a basis of a result of comparison.

4 Claims, 7 Drawing Sheets

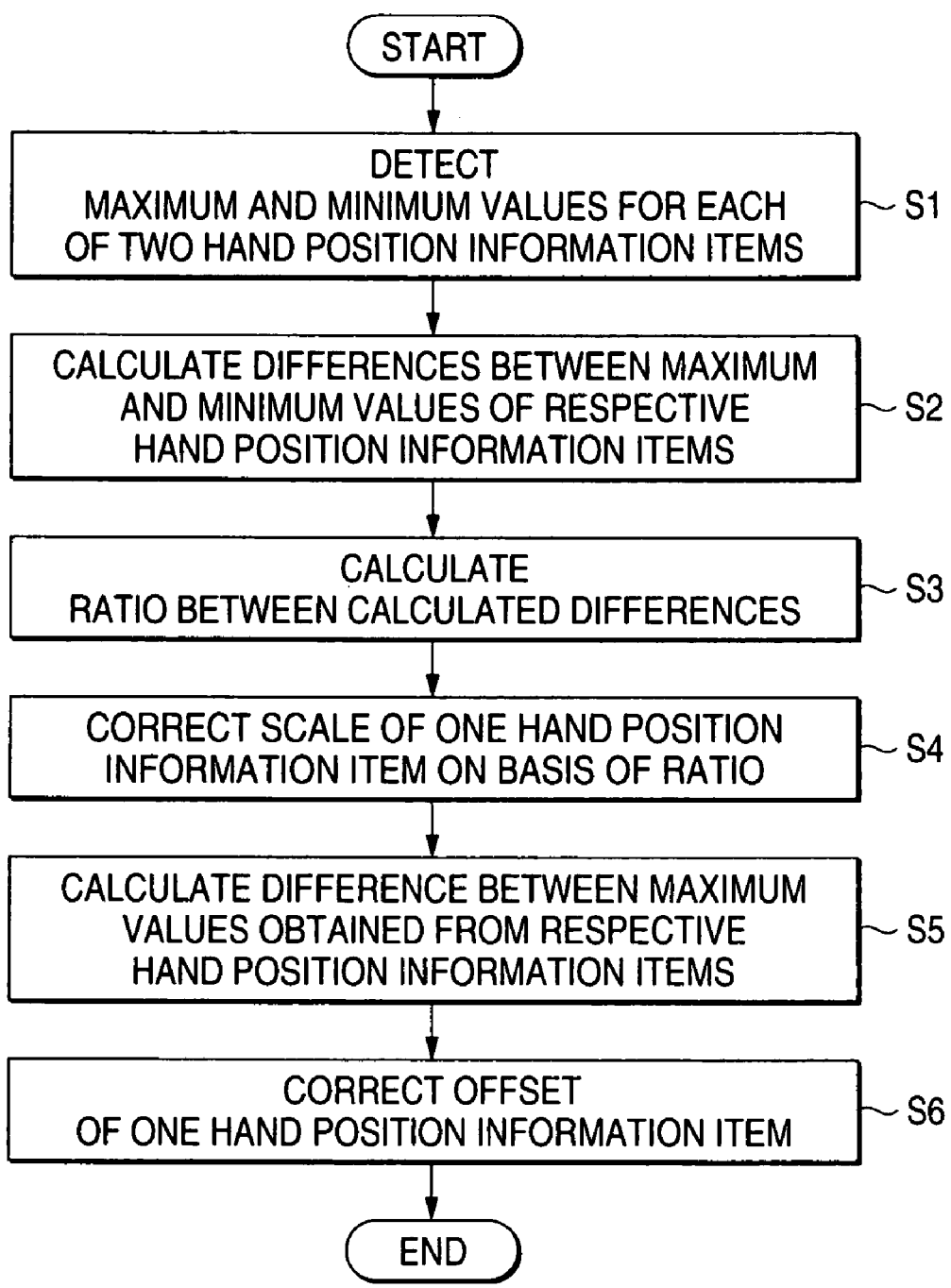

IMAGE ANALYSIS APPARATUS

1. Field of the Invention

The present invention relates to an image analysis apparatus which outputs information of the motion or posture of a subject such as human figure.

2. Description of the Related Art

As an apparatus which identifies the posture of a human figure being a subject, from picked-up image data, there have heretofore been developed one which utilizes the relative positional relation of a hand and a shoulder, etc. (refer to, for example, JP-A-8-320920). Such an apparatus is used in case of, for example, confirming the effect of the rehabilitation of the picked-up human figure in the spot of the rehabilitation.

On the other hand, in a field where information of the motion or posture of such a subject is analyzed, actually it is common practice to pick up the subject from plural positions and thus obtain plural dynamic image data, and to analyze the respective dynamic image data. With the prior art, however, the dynamic image data items are not corrected in spite of the fact that those position information of the subject which are respectively contained in the dynamic image data items are recognized to be different from one another, even at the same axial values in accordance with the arrangement positions of cameras, for example, the distances between the subject and the cameras for picking up images. Therefore, in a case where the plural dynamic image data exist in this manner, the information of coordinate systems different in accordance with the respective dynamic image data items are obtained, and they cannot be directly employed for various processes such as the analysis of a correlation and the generation of three-dimensional information, so that they are narrowly applicable.

The present invention has been made in view of the above circumstances, and has for one of its objects to provide an image analysis apparatus which can enhance the applicability of the position information of the subject parts of a subject to be recognized as are respectively obtained from plural dynamic image data.

SUMMARY OF THE INVENTION

According to an aspect of the present invention, an image analysis apparatus includes a unit that accepts plural dynamic image data obtained by imaging a subject to be recognized from positions different from each other, a unit that detects a part to be detected of the subject to be recognized from series of frame image data respectively included in the plural dynamic image data, and a correction unit that compares information of a detection position of the part to be detected from the respective dynamic image data and corrects at least a part of the information of the detection position of the part to be detected from the respective dynamic image data on a basis of a result of comparison.

Thus, the information of the detection positions of the parts to be detected in the respective dynamic image data can be corrected, and the three-dimensional position information of the part to be detected can be acquired.

Here, the correction means may well compare coordinate values in a designated axial direction, among coordinate values which are contained in the information of the detection positions of the parts detected from the respective dynamic image data, and then correct at least some of the information of the detection positions of the parts detected from the respective dynamic image data, on the basis of the results of the comparisons.

Alternatively, the correction means may well calculate predetermined statistic information items from those coordinate values in the designated axial direction which are contained in the information of the detection positions of the parts detected from the respective dynamic image data, and then correct at least some of the information of the detection positions of the parts detected from the respective dynamic image data, on the basis of the comparisons of the statistic information items.

According to another aspect of the present invention, an image analysis method employing a computer includes accepting plural dynamic image data obtained by imaging a subject to be recognized from positions different from each other, detecting a part to be detected of the subject to be recognized from series of frame image data respectively included in the plural dynamic image data, and comparing information of a detection position of the part to be detected from the respective dynamic image data and correcting at least a part of the information of the detection position of the part to be detected from the respective dynamic image data on a basis of a result of comparison.

According to still another aspect of the present invention, a storage medium readable by a computer, the storage medium storing a program of instructions executable by the computer to perform a function for analyzing image, the function includes the steps of accepting plural dynamic image data obtained by imaging a subject to be recognized from positions different from each other, detecting a part to be detected of the subject to be recognized from series of frame image data respectively included in the plural dynamic image data, and comparing information of a detection position of the part to be detected from the respective dynamic image data and correcting at least a part of the information of the detection position of the part to be detected from the respective dynamic image data on a basis of a result of comparison.

BRIEF DESCRIPTION OF THE DRAWINGS

FIG. 7 is a flow chart showing an operating example of the image analysis apparatus according to the embodiment of the invention.

DETAILED DESCRIPTION OF THE INVENTION

[Example of Basic Operation]

Figure 1:
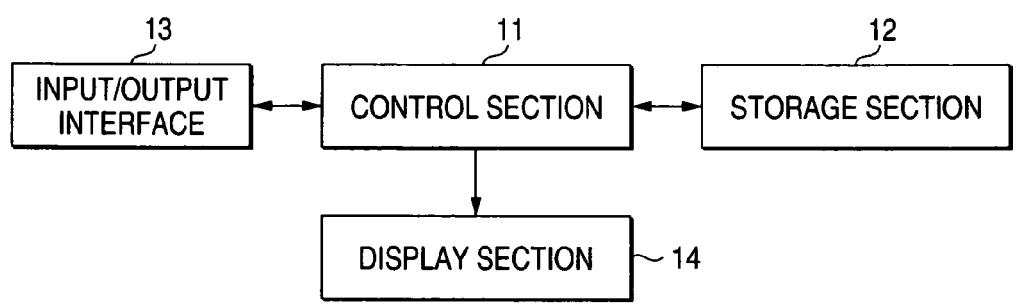
FIG. 1 is a configurational block diagram of an image analysis apparatus according to an embodiment of the present invention.

An embodiment of the present invention will be described with reference to the drawings. An image analysis apparatus according to the embodiment of the invention consists in recognizing the positions of the predetermined parts of a human body from dynamic image data inputted from outside. Here, the positions of a "face" and a "hand" shall be recognized as the predetermined parts. Incidentally, the same holds true also in a case where a "foot tip" is to be recognized instead of the "hand". The image analysis apparatus of this embodiment is concretely configured including a control section 11, a storage section 12, an input/output interface 13 and a display section 14 as shown in FIG. 1. Here, the dynamic image data are acquired from an image pickup unit (a CCD camera or the like), a video playback device or the like, not shown, which is connected to the input/output interface 13. The dynamic image data contain frame image data which are a series of static images obtained by imaging a human figure. Frame numbers which denote the sequence of the pickup, are associated with the individual frame image data.

The control section 11 is operating in accordance with a program stored in the storage section 12, and it is basically executing a process which specifies the image of the part of the face (a face identification processing) and a process which specifies the image of the part of the hand (a hand identification processing), for each of the series of static image frames which are contained in the dynamic image data acquired from outside, and a motion identification process which identifies the motion of the human figure being a subject, on the basis of the information of the relative positions of the face and hand specified by the identification processing. The concrete contents of these processes will be explained later.

The storage section 12 is a computer-readable record medium which stores therein the program that is run by the control section 11. Besides, the storage section 12 operates as a work memory which stores therein various data that are necessary during the processes of the control section 11.

The input/output interface 13 which is connected to the external device, for example, camera device acquires the image data from the external device and outputs them to the control section 11 as shown in FIG. 1. Besides, the input/output interface 13 outputs various data to the external device in compliance with instructions which are inputted from the control section 11. The display section 14 is, for example, a display panel, and it displays information in compliance with an instruction which is inputted from the control section 11.

Figure 2:
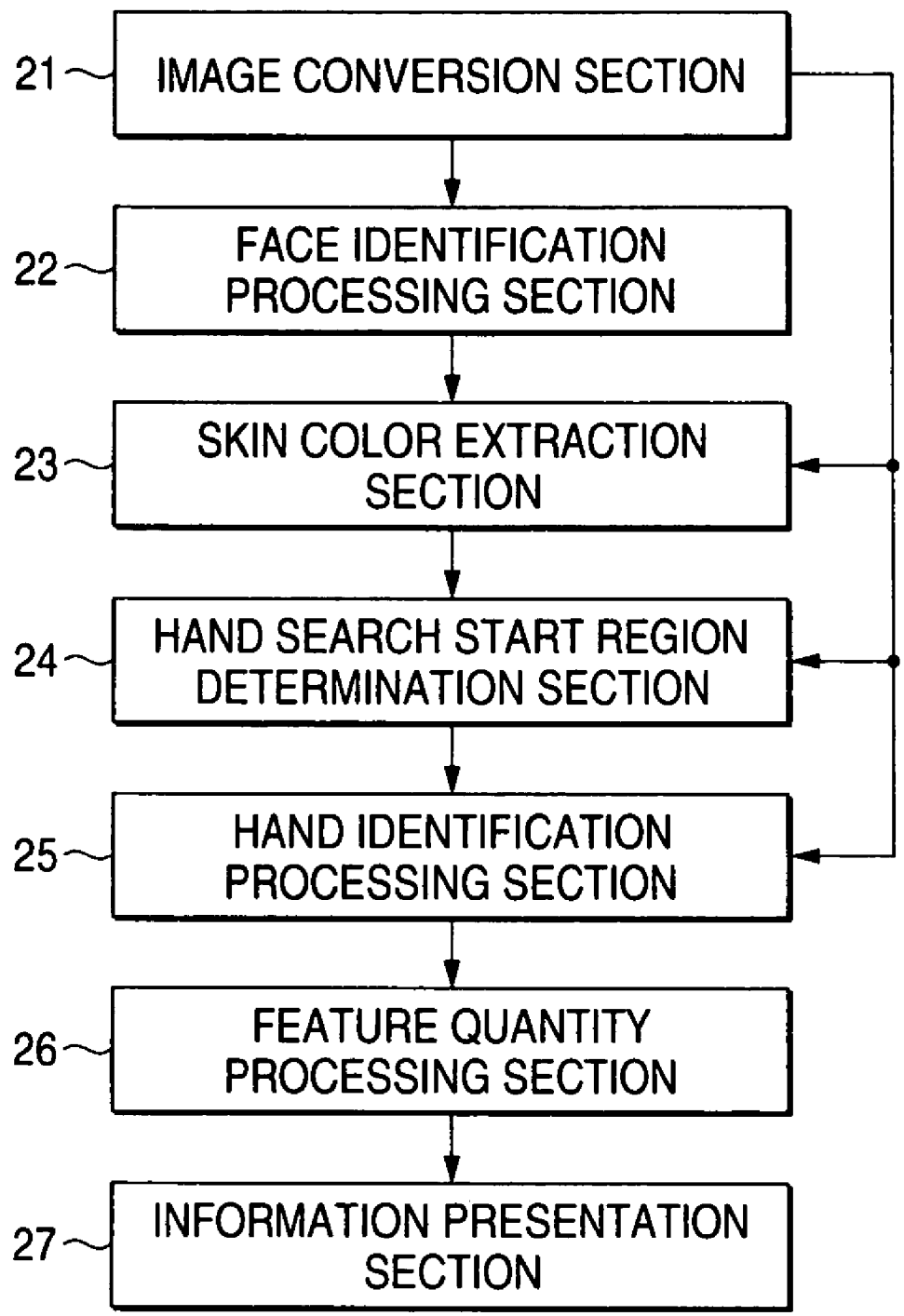
FIG. 2 is a functional block diagram of the image analysis apparatus according to the embodiment of the invention.

As functionally shown in FIG. 2, the program which is run by the control section 11 is configured including an image conversion section 21, a face identification processing section 22, a skin color extraction section 23, a hand search start region determination section 24, a hand identification processing section 25, a feature quantity processing section 26 and an information presentation section 27.

The image conversion section 21 converts the frame image data to be processed acquired through the input/output interface 13, into image data of gray scale (gray scale data), and it outputs the gray scale data to the face identification processing section 22. Besides, the image conversion section 21 converts the frame image data to be processed into the image data of hue images (hue data), and it outputs the hue data to the skin color extraction section 23, hand search start region determination section 24 and hand identification processing section 25.

The face identification processing section 22 executes the process which specifies the part of the face on the basis of the gray scale data inputted from the image conversion section 21. As will be described later, the face identification processing section 22 may recognize the facial part in the image data, on the basis of data learnt and acquired beforehand. Besides, the face identification processing section 22 may well be capable of specifying, not only the position of the face, but also the sense (three-dimensional sense) and size of the face.

The face identification processing section 22 may extract the part corresponding to the face of the human figure, from among the gray scale data by employing a first learning database which has been obtained in such a way, for example, that the face of the human figure is subjected to a learning process after the conversion of the frame image data contained in the dynamic image data, into the gray scale data. On this occasion, a measure to be stated below may well be taken. More specifically, facial parts have been specified by a predetermined method so as to previously prepare the image of an upright and forward face (the normal image), and plural facial images in which the face is rotated a predetermined angle rightward and leftward from the normal image, respectively. A second learning database is created by subjecting the prepared facial images. Using the second learning database, the images of the facial parts are converted (normalized) so as to approach to the normal image. Finally, whether or not the data of the normalized images express the image of the face is judged by employing the information items stored in the first learning database. According to the measure, a rotational angle can be discriminated in the process of the normalization, and hence, whether or not the image data express the face can be promptly discriminated by the normalization process. Moreover, when the rotational angle obtained in the course is outputted, it can be used for the process utilizing the sense of the face as stated above. The face identification processing section 22 stores information items expressive of the position, size, sense etc. of the specified face, in the storage section 12 as face position information.

The skin color extraction section 23 derives the partial image of that region of the hue data inputted from the image conversion section 21 which corresponds to the part of the face specified by the face identification processing section 22, and it calculates and outputs the mean hue data of the partial image. Concretely, the skin color extraction section 23 outputs as skin color information items, the histograms of pixel values in hue data which are contained in the region that is defined by regional information outputted from the face identification processing section 22. The skin color information items are the histograms of the color of the face specified by the face identification processing section 22 (that is, the color of the skin of the face), and they are the information of the skin color which is, so to speak, peculiar to the pertinent human figure. The apparatus of this embodiment extracts the skin color peculiar to the subject, and specifies the part of the hand by utilizing the extracted skin color. Incidentally, comparisons are made on the basis of hues here, in consideration of a case where the luminosities of the skin colors of the face and hand have changed due to, for example, sunburn.

The hand search start region determination section 24 and the hand identification processing section 25 detect a part where the hand is picked up, from the individual frame image data items. Here, first of all, the hand search start region determination section 24 tentatively specifies a candidate part where the hand is picked up (a search start region), within the individual frame image data items. Thereafter, the hand identification processing section 25 starts a search process with the specified search start region as a start point and specifies the region where the hand is picked up, by employing a cam shift algorithm (Gary R. Bradski, Computer Vision Face Tracking For Use in a Perceptual User Interface: Intel Technology Journal Q2, 1998). Incidentally, although an example employing the cam shift method will be explained here, the invention is not restricted thereto.

The hand search start region determination section 24 generates likelihood values expressive of the probability (likelihood) of the skin color, for individual pixels on the hue data inputted from the image conversion section 21, on the basis of the histograms of the skin color information items. Further, it arrays the likelihood values similarly to the individual pixels of the hue data, thereby to generate a likelihood map. The likelihood value may be set at, for example, a quotient obtained in such a way that the value of the histogram which corresponds to the hue of the pixel handled in the calculation is divided by the summation of the values of the histograms. Alternatively, a known method called the "back-projection scheme" or the "correlation scheme" may well be employed. Incidentally, although the map of the likelihood values is employed here, it is not restrictive. A map of score values may well be employed by generating the score values from the frequency values of the histograms.

In this case, the likelihood is set at "0" as to the region which corresponds to the part of the face. Thus, the erroneous detection of the part of the face as that of the hand can be reliably prevented.

Further, the hand search start region determination section 24 scans the likelihood map with rectangular regions each having a predetermined size, and it sets at least one scan position in the order of the magnitudes of the total values of the likelihood values within the rectangular regions. Besides, it sets the rectangular region at the scan position, as the search start region. Here, in a case where the number of subjects (hands in this case) picked up is previously known, search start regions the number of which corresponds to the known number may well be set.

The hand identification processing section 25 executes processes to be stated below, with the initial position of a search region set at each search start region determined by the hand search start region determination section 24, on the hue data inputted from the image conversion section 21.

That is, the hand identification processing section 25 finds the moments of the likelihood values contained in the search regions among the hue data, as to the search regions whose initial positions have been respectively set on the basis of the individual search start regions, by using the pixel values of the pixels (the values of hues) within the search regions and values indicated by the skin color information items outputted by the skin color extraction section 23.

Besides, the hand identification processing section 25 moves the search regions on the basis of the found moments. Here, the moments are indicated by, for example, the following:

$$m_{00} = \sum_i \sum_j h(i, j)$$

$$m_{10} = \sum_i \sum_j i \cdot h(i, j)$$

$$m_{01} = \sum_i \sum_j j \cdot h(i, j)$$

$$m_{20} = \sum_i \sum_j i^2 \cdot h(i, j)$$

$$m_{02} = \sum_i \sum_j j^2 \cdot h(i, j)$$

$$m_{11} = \sum_i \sum_j i \cdot j \cdot h(i, j)$$

Here, h(i, j) denotes the likelihood value at the coordinates (i, j) of the likelihood map.

The hand identification processing section 25 sets a center of gravity by the zero-th order moment $m_{00}$ among the above formulae, and it moves the search region to a position centering round the center of gravity. Besides, it determines the size and rotational magnitude of the search region by the first-order and second-order moments, thereby to update the search region.

Thenceforth, the hand identification processing section 25 iterates the updating process until the movement magnitude of the search region becomes less than a predetermined threshold value in spite of the updating thereof, or until the number of times of updating reaches a predetermined number of times (until a convergent condition is satisfied). Besides, the hand identification processing section 25 specifies the search region in the case of the satisfaction of the convergent condition, as the region where the hand is picked up, and it stores information items defining this region (for example, a set which consists of the apical coordinates of a polygon surrounding the contour of the region), in the storage section 12 as hand position information.

In this manner, the facial recognition process is first executed in the individual frame image data, the region where the hand will exist at a high possibility is set as the initial position on the basis of the information of the color of the recognized face, and the region is moved, has its size altered and is rotated by the cam shift method or the like, so as to define the region where the hand is contained.

The feature quantity processing section 26 generates information of the motion of the picked-up human figure, on the basis of a movement state on the dynamic image data of the image regions which contain the predetermined parts (face and hand) of the human body as have been detected in the individual frame image data. By way of example, the feature quantity processing section 26 generates at least one item of feature quantity information of the basis of the series of hand position information items stored in the storage section 12, and it outputs the frame number of the frame image data corresponding to a timing at which the feature quantity information satisfies a predetermined condition (information specifying the frame image data). Here, the "feature quantity information" may well be, for example, the hand position information itself. Besides, in a case where the hand position information being the feature quantity information does not fluctuate in excess of a predetermined period (a predetermined number of the frame image data), the frame number of the frame image data corresponding to a period for which the hand position information does not fluctuate is outputted.

More specifically, the feature quantity processing section 26 calculates a difference from the hand position information in the next frame image data, as to each of the frame image data. Concretely, it calculates the magnitude of the difference between the hand position information corresponding to the i-th frame image data and the hand position information corresponding to the (i+1)-th frame image data. Besides, it selects the frame numbers of the frame image data whose differences are less than a predetermined movement-magnitude threshold value, and it generates a sequence which consists of the selected frame numbers. Further, the feature quantity processing section 26 detects parts at each of which the frame numbers are successive, from the generated sequence, and it finds the lengths of the frame numbers sequences of the detected parts. A process for detecting the part of the successive Nos. from the sequence, and a process for finding the length of the detected partial sequence are widely known, and they shall therefore be omitted from detailed description here.

Figure 3:
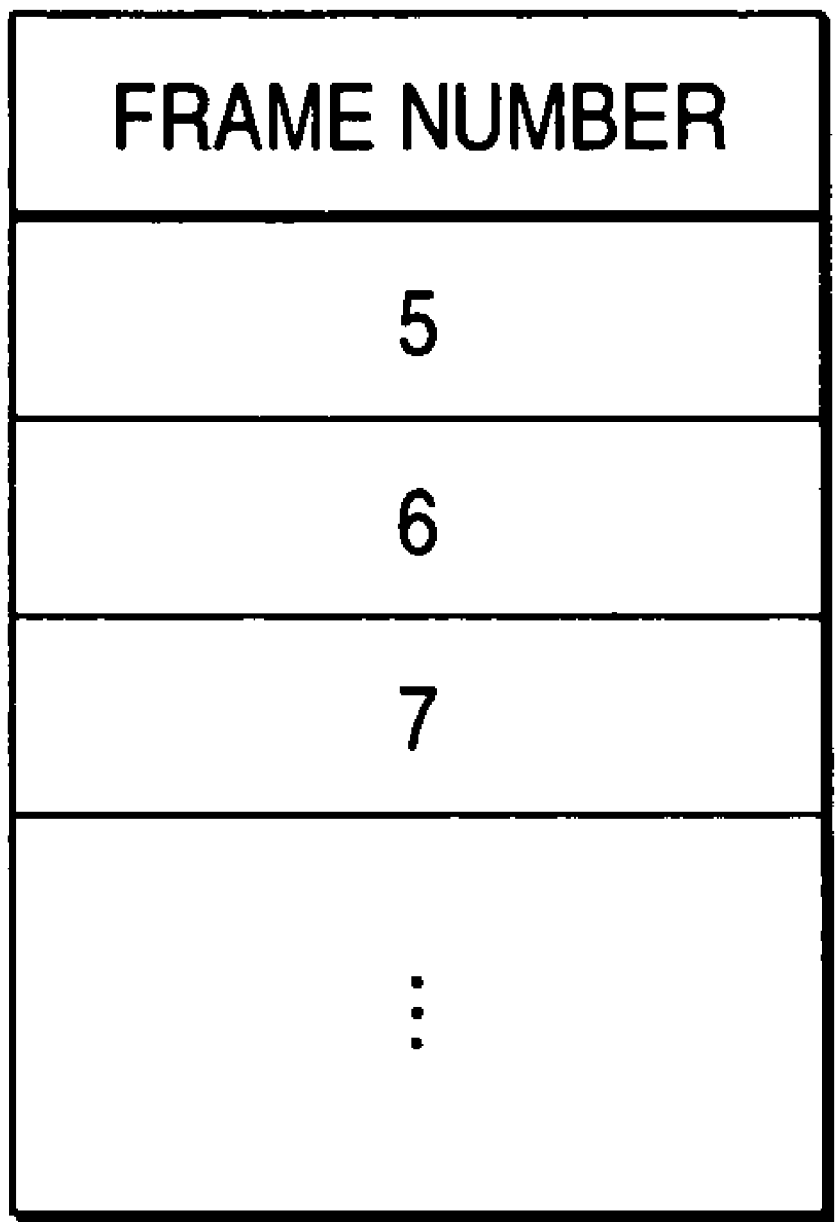
FIG. 3 is an explanatory diagram showing an example of feature time-point information which is generated by the image analysis apparatus according to the embodiment of the invention.

The feature quantity processing section 26 checks whether or not a part whose length exceeds a threshold value for a predetermined period exists among the parts of the successive frame numbers. In the existence of such a part, the processing section 26 stores, for example, the head frame number and tail frame number of the pertinent part in the storage section 12 as feature time-point information specifying the pertinent part. The feature time-point information accordingly becomes data listing the frame numbers. (FIG. 3).

Figure 4:
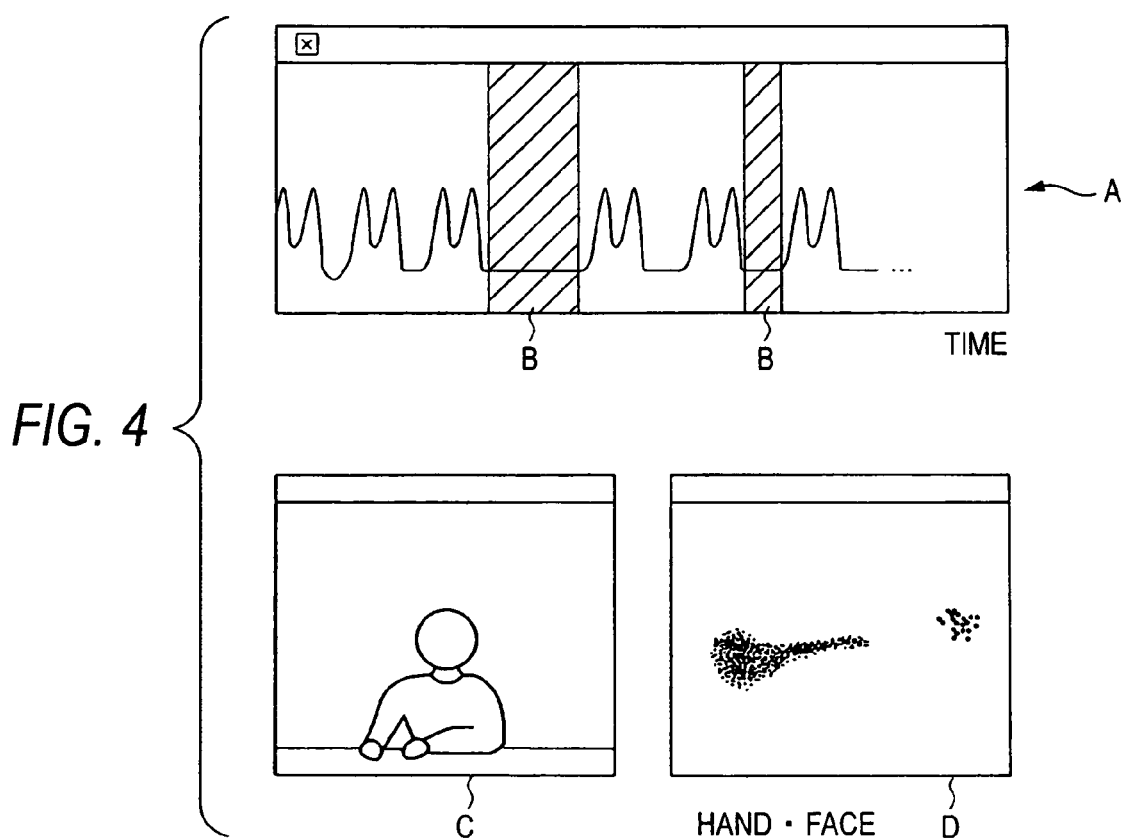
FIG. 4 is an explanatory diagram showing screen examples which are displayed by the image analysis apparatus according to the embodiment of the invention.

The information presentation section 27 displays and outputs the face position information and the hand position information stored in the storage section 12, on and to the display section 14 in compliance with the instructive manipulation of a user. Besides, the information presentation section 27 controls the display aspects of the face position information and hand position information by using the feature time-point information stored in the storage section 12. As shown in FIG. 4 by way of example, the information presentation section 27 presents as a graph, the temporal fluctuations of the coordinate values of the hand on the frame image data as are contained in the hand position information (here, a value on one axis among the coordinate values is illustrated) (A). Besides, temporal ranges which correspond to the frame numbers indicated by the feature time-point information items within the graph are enhanced by the alteration of the background color of the graph, or the like (B).

Further, the information presentation section 27 displays the picked-up dynamic image data (C), and it reproduces the pertinent dynamic image data from a position corresponding to the frame number designated on the graph (A). Thus, the user is permitted to instruct the reproduction of a dynamic image corresponding to the enhanced part, and he/she is permitted to selectively reproduce and browse the dynamic image of the part of a featuring motion in the motion of the picked-up human figure. Further, the information presentation section 27 may well create an image in which the coordinates of the hand position information and face position information are plotted as points (D). Incidentally, legends which are distinguishable from each other are employed for the hand and the face.

In this manner, according to this embodiment, the dynamic image of the part of the featuring motion can be selectively reproduced and browsed without referring to the whole dynamic image data, so that the burden of motion confirmation on the person in charge can be relieved to heighten a job efficiency.

[Plurality of Dynamic Image Data]

Further, in the description thus far made, it has been assumed that one item of dynamic image data is to be processed, but it is also allowed to employ plural dynamic image data which are picked up at the same time and which are synchronous. Here, the synchronism of the dynamic image data can be incarnated in such a way that identical frame number is associated with the frame image data of the individual dynamic image data items picked up at the same time point. A method of creating such plurality of dynamic image data items synchronous with one another is widely known, and it shall therefore be omitted from detailed description here.

In an example, two dynamic image data items are generated by employing two cameras. More specifically, in case of the rehabilitation of walk training, a facial part is picked up by the first camera so as to generate first dynamic image data containing the facial part. Besides, the part of lower limbs is picked up by the second camera so as to generate second dynamic image data containing the part of a leg.

In this case, by way of example, the control section 11 specifies the regions of the face from the individual frame image data of the first dynamic image data, and it further detects expressions so as to generate expression information items denoting the expressions of a human figure in the individual image data. Besides, the control section 11 detects the loci of the shakes of the head in up, down, left and right directions (the locus of the centers of the detection regions of the face, etc.), from the detection regions of the face, and it stores the loci of the shakes and the expression information items in the storage section 12 in association with the frame numbers of the individual frame image data. Further, the control section 11 detects the height of a foot tip, the height of a knee, the relative positions of the foot tip and knee, the moving speeds of the foot tip and knee, and a halting time period (a time period for which the foot tip or knee lies in substantially the same place), from the individual frame image data of the second dynamic image data. Here, as in the case of the detection of the hand position information, the foot tip can be detected from the second dynamic image data, by using skin color information obtained from the regions of the face as have been specified from the individual frame image data in the first dynamic image data. Besides, in a case where the detection of a position is difficult with the skin color information based on the facial regions, for example, in a case where the skin is not bared on account of clothes or the likes or where too many parts are bared, a marker whose color is different from the skin color and the colors of cloth, background etc. is attached to the foot tip or knee of the human figure to be picked-up, and the position of the foot tip or knee is specified by detecting the marker of the pertinent color from the second dynamic image data.

Incidentally, a method of detecting the expressions is, for example, one as stated in M. J. Black and Y. Yacoob, "Recognizing Facial Expressions in Image Sequences Using Local Parameterized Models of Image Motion", Int'l J. Computer Vision, vol. 25, No. 1, pp. 23-48, 1997, and it shall therefore be omitted from detailed description here.

Besides, the control section 11 executes the process of the feature quantity processing section 26 so as to store frame numbers corresponding to the halting time period of, for example, the foot tip or knee, in the storage section 12 as feature time-point information. Further, it acquires frame numbers within a period during which the expression of the face is a "wry face", so as to store the frame numbers in the storage section 12 as feature time-point information.

Besides, as the process of the information presentation section 27, the dynamic image parts of predetermined numbers of frames before and after the frame image data specified by the frame numbers of the feature time-point information are enhanced and presented to a user. With this measure, the dynamic image of the part of the period during which "the position of the foot tip or knee halts" or the period during which "the wry face is made", that is, the part of the featuring motion can be selectively reproduced and browsed without referring to the whole dynamic image data, so that the burden of motion confirmation on the person in charge can be relieved to heighten a job efficiency.

Also in this case, the plural feature time-point information are obtained. Therefore, the aspect of the enhancement may well be altered depending upon how many feature time-point information items each pertinent frame number is contained in, as to the frame numbers listed in common in such plurality of feature time-point information items.

[Size Correction Utilizing Size of Face]

Further, in the case where the plural dynamic image data of the face and leg, or the likes picked up in the same direction are to be processed as described above, the position information of that predetermined part of the human body which has been detected, for example, the height of the foot tip may well be corrected using the size of the face detected from one of the dynamic image data items (the size of the region detected as containing the face). More specifically, the size Ss of the face in predetermined frame image data is set as a reference size, and a value is generated in such a way that the size S of the face in other frame image data is divided by the reference size Ss. The value becomes one which denotes the fluctuation ratio of the position information of a part of the human body, and hence, the position information of that predetermined part of the human body which is to be detected in the other frame image data is multiplied by the value S/Ss.

As a practicable example, in a case where the size of the face in the frame image data whose frame number is "1" (that is, in the head frame image data) is the reference size Ss, and where the size of the face and the height of the foot tip are respectively S and ho in the succeeding frame image data, the information of the height of the foot tip is corrected as:

$$h = ho \times (S/Ss)$$

Thus, even when the height of the foot tip has fluctuated due to the distance between the camera and the human figure, the fluctuation can be corrected.

[Handling of Plurality of Dynamic Image Data Containing Identical Range]

Further, in the case where the human figure is picked up by employing the plural cameras as described above, the plural cameras may well pick up those parts of the human figure which are common at least partially. By way of example, it is also allowed to pick up the human figure frontways by the first camera, and to pick up the human figure sideways by the second camera. In this case, the face and hand, or the like parts can be picked up in common by both the cameras.

In a case where, in this manner, the common parts are contained in the plural dynamic image data items to be processed, the part of the hand, for example, is picked up frontways and sideways, whereby the three-dimensional motion of the hand can be acquired.

Figure 5:
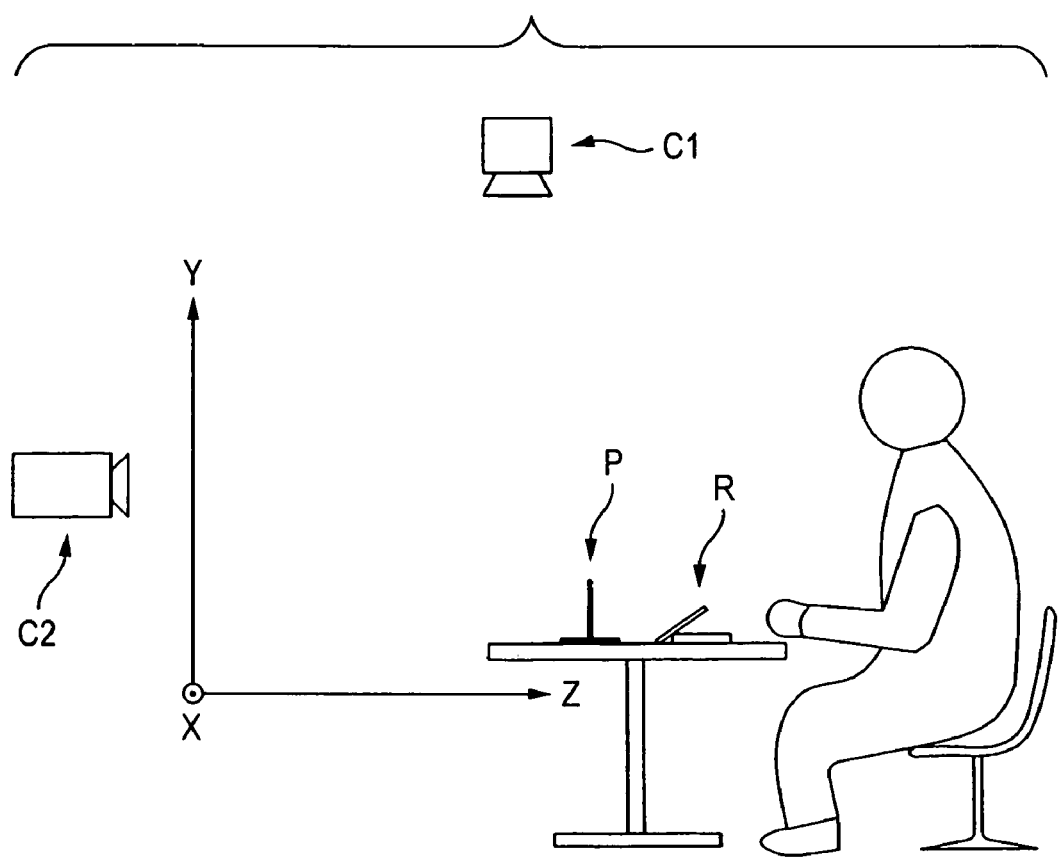
FIG. 5 is an explanatory view showing the arrangement example of cameras in the case of picking up dynamic image data which are inputted to the image analysis apparatus according to the embodiment of the invention.

The control section 11 may well execute a process for generating the movement locus of the hand as three-dimensional information. Suppose an example in which, as shown in FIG. 5, a human figure to be picked up sits in front of a desk and performs the rehabilitation of taking up the quoit (R) of ringtoss from on the desk and then passing the quoit through the hub (P) thereof located on the desk. Besides, it is assumed here that a first camera C1 picks up the desk from above, while a second camera C2 picks up the human figure frontways. Accordingly, both the first and second cameras C1 and C2 pick up the hand of the human figure, but the face of the human figure is picked up by only the second camera C2.

The control section 11 acquires first dynamic image data and second dynamic image data which have been respectively picked up by the first and second cameras C1 and C2. Besides, it executes the process of the image conversion section 21 for each of the dynamic image data. Further, it executes a process for specifying the part of the face, from the gray scale data of the second dynamic image data, as the process of the face identification processing section 22, thereby to acquire face position information.

As the process of the skin color extraction section 23, the control section 11 derives the partial image of a region corresponding to the part of the face specified by the face identification processing section 22, from among those hue data of the second dynamic image data which are inputted from the image conversion section 21, and it calculates and outputs the mean hue data of the partial image.

The hand search start region determination section 24 and hand identification processing section 25 of the control section 11 subsequently detect parts where the hand is picked up, from the respective frame image data of the first and second dynamic image data. On this occasion, the hand search start region determination section 24 generates first and second likelihood maps which correspond to the first and second dynamic image data, respectively. Here, the hand search start region determination section 24 generates the first likelihood map on the basis of that skin color information of the facial part which has been acquired from the second dynamic image data, with the process directed to the first dynamic image data. Besides, it generates the second likelihood map on the basis of that skin color information of the facial part which has been acquired from the second dynamic image data, with the process directed to the second dynamic image data. In this manner, the likelihood maps concerning all the dynamic image data are generated using the skin color information acquired from the partial dynamic image data, whereby the detection precision of the hand can be heightened.

Figure 6:
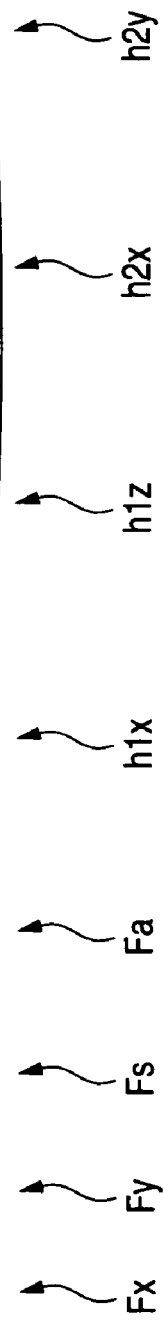
FIG. 6 is an explanatory diagram showing a held example of face position information and hand position information which are generated by the image analysis apparatus according to the embodiment of the invention.

Besides, the control section 11 executes a process to be explained below, for the hand position information items which have been detected on the basis of the respective frame image data of both the dynamic image data. Each of these hand position information items is information of two-dimensional coordinate values, and the information of the coordinate values of the two axes of X- and Z-axes shown in FIG. 5 is obtained from the first dynamic image data, while the information of the coordinate values of the two axes of X- and Y-axes shown in FIG. 5 is obtained from the second dynamic image data. By the way, in FIG. 5, the X-axis extends toward this side from the opposite side of the sheet of the drawing. As shown in FIG. 6, accordingly, the control section 11 obtains in association with frame numbers and on the basis of the respective dynamic image data, the position coordinates Fx and Fy of the face as indicated by the face position specification information (the coordinates of the center of the region recognized to contain the face, or the likes, which are designated as X and Y coordinates in this case), the size Fs of the face (the size of the region recognized to contain the face), the inclination Fa of the face, the X-axial coordinate H1$x$ and Z-axial coordinate H1$z$ of the hand position information obtained from the first dynamic image data, and the X-axial coordinate H2$x$ and Y-axial coordinate H2$y$ of the hand position information obtained from the second dynamic image data. The control section 11 stores the data of a table shown in FIG. 6, in the storage section 12.

Besides, the control section 11 generates the three-dimensional information of the hand position information from the stored data of the table. More specifically, the control section 11 accepts the designation of the hand position information items denoting the same axial direction, among the hand position information items H1$x$, H1$z$, H2$x$ and H2$y$, from a user beforehand. Here, both the hand position information items H1$x$ and H2$x$ are the X-axial information items and denote the same axial direction. Therefore, the control section 11 is assumed to have accepted the designation that these information items H1$x$ and H2$x$ are common.

The control section 11 executes a process to be explained below, for the two hand position information items designated as being common. First, either of the two hand position information items is set as reference information, while the other is set as information to be adjusted. Here, the hand position information obtained from the first dynamic image data is set as the reference information. Besides, as shown in FIG. 7, the maximum value and minimum value are detected for each of the two hand position information items (S1).

Both the hand position information items change as the hand moves. In case of a movement as in the ringtoss in the example here, the hand reciprocates and moves between the X-coordinate value of a position where the quoit is put and the X-coordinate value of a position where the hub of the ringtoss exists, and hence, the motion of the hand demonstrates a periodic curve like a trigonometric function.

By way of example, the control section 11 detects the maximum values (H1xmax, H2xmax) and minimum values (H1xmin, H2xmin) of the respective hand position information items at the step S1, and it calculates the differences between the maximum values and minimum values in the respective hand position information items. That is, it calculates the following (S2):

$$\Delta H1 = H1x\text{max} - H1x\text{min}$$

$$\Delta H2 = H2x\text{max} - H2x\text{min}$$

Besides, the control section 11 finds the ratio of the information to be adjusted to the reference information (S3). Here, the case of setting the hand position information obtained from the first dynamic image data, as the reference information, is exemplified, and hence, the found ratio becomes:

$$R = \Delta H2/\Delta H1$$

Besides, among the data stored in the storage section 12, the X-axial coordinate H2x and Y-axial coordinate H2y of the hand position information obtained from the second dynamic image data are multiplied by the ratio R, thereby to correct the values of the second dynamic image data (S4). Owing to the corrections, the difference of the scales of the coordinate values as attributed to the discrepancy of the distances between the cameras and the hand of the human figure, and so forth, can be corrected.

Further, in the respective hand position information items, a difference is obtained by subtracting the maximum value of the information to be adjusted from the maximum value of the reference information (S5).

$$\Delta H = H1x\text{max} - H2x\text{max}$$

Besides, among the data stored in the storage section 12, the difference $\Delta H$ is added to the individual X-axial coordinate values H2x of the hand position information obtained from the second dynamic image data (S6). Thus, it is possible to correct the differences (shifts) of the positions of the coordinate values as attributed to the discrepancies of the arrangement positions of the cameras, etc. Incidentally, the value of the difference on which the corrections of the shifts are based here may well be obtained by subtracting the minimum value of the information to be adjusted from the minimum value of the reference information, not on the basis of the maximum values.

Although the statistic information of the maximum and minimum values of the hand position information items are used here, they may well be replaced with other statistic information items (for example, the mean values of the maximum peaks and the mean values of the minimum peaks). Alternatively, the differences between the mean values of the hand position information items, for example, may well be used for the corrections of the shifts.

In this manner, according to this embodiment, the positions of the hand of the human figure being the subject are acquired on the basis of the plural dynamic image data, and the corrections are made so that the ratio and offset of the values in the designated axial direction among the information of the positions may come into agreement. Therefore, the position information items can be directly employed for various processes such as the analysis of a correlation and the generation of three-dimensional information, and their applicability can be enhanced.

Regarding the above example, it is possible to generate the three-dimensional information which consists of the coordinate H1x, the corrected coordinate H2y and the coordinate H1z.

The entire disclosure of Japanese Patent Application No. 2005-174412 filed on Jun. 14, 2005 including specification, claims, drawings and abstract is incorporated herein by reference in its entirety.

What is claimed is:

1. An image analysis apparatus comprising:
   a unit that accepts a plurality of dynamic image data obtained by imaging a subject to be recognized from positions different from each other;
   a unit that detects a detection target part of the subject to be recognized from series of frame image data included in each of the plurality of dynamic image data; and
   a correction unit that compares plural pieces of information of detection positions of the detection target part, which are obtained from the respective frame image data of the dynamic image data, and corrects at least a part of the information of the detection positions of the detection target part, which are obtained from the respective frame image data of the dynamic image data, on a basis of a result of the comparison wherein
   in the comparison, the correction unit compares coordinate values in a designated axial direction among coordinate values included in the information of the detection positions of the detection target part, which are obtained from the respective frame image data of the dynamic image data, and
   the correction unit corrects at least the part of the information of the detection positions of the detection target part, which are obtained from the respective frame image data of the dynamic image data, on a basis of the result of the comparison.

2. An image analysis apparatus comprising:
   a unit that accepts a plurality of dynamic image data obtained by imaging a subject to be recognized from positions different from each other;
   a unit that detects a detection target part of the subject to be recognized from series of frame image data included in each of the plurality of dynamic image data; and
   a correction unit that compares plural pieces of information of detection positions of the detection target part, which are obtained from the respective frame image data of the dynamic image data, and corrects at least a part of the information of the detection positions of the detection target part, which are obtained from the respective frame image data of the dynamic image data, on a basis of a result of the comparison wherein
   the correction unit calculates predetermined statistic information from the coordinate values in the designated axial direction, which are included in the information of the detection positions of the detection target part being obtained from the respective dynamic image data, and corrects at least the part of the information of the detection positions of the detection target part, which are obtained from the respective frame image data of the dynamic image data, on a basis of a comparison of the statistic information.

3. An image analysis method employing a computer, comprising:

accepting plural pieces of dynamic image data obtained by imaging a subject to be recognized from positions different from each other;

detecting a detection target part of the subject to be recognized from series of frame image data included in each of the plural pieces of dynamic image data; and comparing, using the computer, plural pieces of information of detection positions of the detection target part, which are obtained from the respective frame image data of the dynamic image data, and correcting at least a part of the information of the detection positions of the detection target part, which are obtained from the respective frame image data of the dynamic image data, on a basis of a result of the comparison, wherein in the comparison, the correction unit compares coordinate values in a designated axial direction among coordinate values included in the information of the detection positions of the detection target part, which are obtained from the respective frame image data of the dynamic image data, and the correction unit corrects at least the part of the information of the detection positions of the detection target part, which are obtained from the respective frame image data of the dynamic image data, on a basis of the result of the comparison.

4. A storage medium readable by a computer, the storage medium storing a program of instructions executable by the computer to perform a function for analyzing image, the function comprising:

accepting plural pieces of dynamic image data obtained by imaging a subject to be recognized from positions different from each other;

detecting a detection target part of the subject to be recognized from series of frame image data included in each of the plural pieces of dynamic image data; and comparing plural pieces information of detection positions of the detection target part, which are obtained from the respective frame image data of the dynamic image data, and correcting at least a part of the information of the detection positions of the detection target part, which are obtained from the respective frame image data of the dynamic image data, on a basis of a result of the comparison, wherein in the comparison, the correction unit compares coordinate values in a designated axial direction among coordinate values included in the information of the detection positions of the detection target part, which are obtained from the respective frame image data of the dynamic image data, and the correction unit corrects at least the part of the information of the detection positions of the detection target part, which are obtained from the respective frame image data of the dynamic image data, on a basis of the result of the comparison.

* * * * *